Patented Aug. 7, 1934

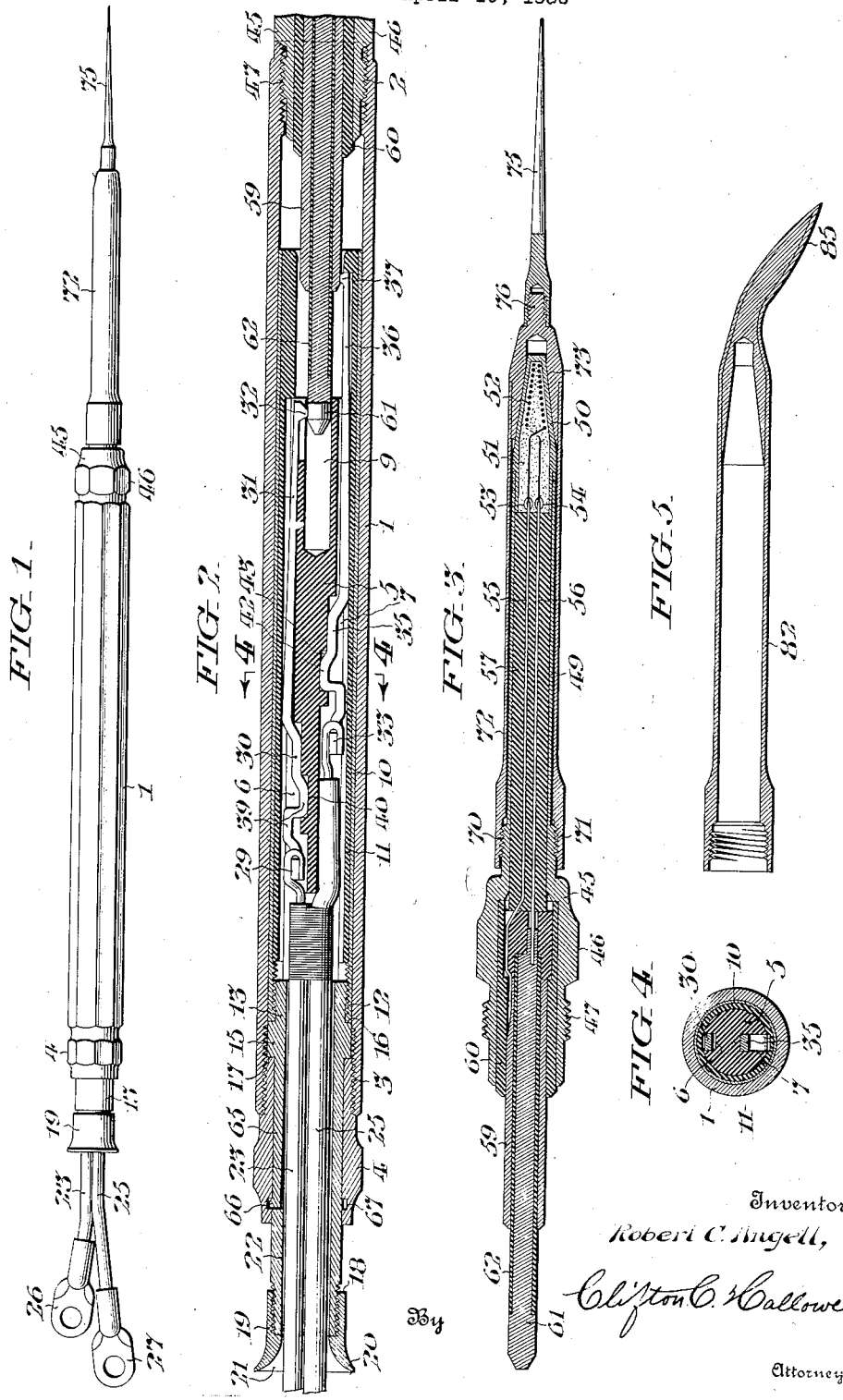

1,968,867

UNITED STATES PATENT OFFICE 1,968,867

ELECTRIC INSTRUMENT HANDLE

Robert C. Angell, Prince Bay, N. Y., assignor to The S. S. White Dental Manufacturing Company, a corporation of Pennsylvania Application April 10, 1930, Serial No. 443,026

4 Claims. (Cl. 219—21)

My invention relates particularly to that class of electrical heating devices that comprise a handle having a heating element arranged to induct heat into an instrument that may be held thereby and utilized for various purposes such as the drying of root canals of a tooth to be filled, cauterizing, bleaching or in working thermal plastics, etc., and is especially directed to operative means within the handle which is automatically actuated by manipulation of the handle in withdrawing and replacing it with respect to its holder or support to effect closing or opening of the electric circuit, as may be.

The principal objects of my invention are to provide an implement in which heat electrically produced and maintained at a predetermined temperature may be utilized with safety and comfort in performing various operations.

Other objects of my invention are to provide a heat directing implement in which the heat is concentrated and retained in close proximity to the heating instrument by which the heat is directed to the point where it is to be utilized.

Further objects of my invention are to provide an electric implement in which the switch mechanism is so disposed and arranged as to be actuated axially to close and open the electric circuit by movement of the handle out of or into its holder or support.

My invention further includes an implement that is substantially free from dust-catching pockets or crevices and that may be readily taken apart and be sterilized with but a minimum of sterilizing fluid tending to cling thereto.

My invention comprehends an electric instrument handle enclosing a switch in which the parts are held in place by the shell or casing, which when removed frees said parts for inspection or removal, repair and replacement.

The form of my invention as hereinafter described comprises an electric implement comprising a handle unit, a switch unit therein, an instrument-holding unit attached thereto and a separable instrument unit removably engaged with said instrument-holding unit, the instrument-holding unit being provided at its forward end with a heating element having leads directed therethrough and connected with suitably provided electrical contacts at its rear end, and being further provided with an elongated instrument-carrying thimble removably connected thereto remote from said heating element but having contact with the shell enclosing said heating element, so that the heat from said heating element will be conducted forwardly directly to the instrument carried by said thimble without heating its inner end of the thimble at its point of connection with said heating unit. Said instrument-holding unit is detachably connected with the handle unit which includes switch mechanism longitudinally movable in said handle unit and carrying electrical leads having spring contacts in engagement with the respective contacts of said instrument-holding unit to connect the heating element with line wires and arranged to be automatically actuated when the handle is pulled out from its holder to close the circuit through said heating element and when said handle is replaced in its holder to open said circuit.

My invention also includes all of the various novel features of construction and arrangement as hereinafter more definitely specified.

In the accompanying drawing, Figure 1 is a side elevational view of an electric instrument handle constructed in accordance with my invention; Fig. 2 is a central vertical longitudinal sectional view of the handle and switch elements of the implement shown in Fig. 1 showing a fragment of the heat-directing instrument or needle holder in position for actuation therein; Fig. 3 is a central vertical longitudinal sectional view of said holder with a separable heat-directing instrument or needle attached thereto; Fig. 4 is a transverse vertical sectional view of said implement taken through the handle portion thereof on the line 4—4 in Fig. 2; and Fig. 5 is a central vertical longitudinal sectional view of the outer sleeve of the instrument or needle holder and showing the heat-directing instrument formed in unitary relation therewith.

The electric instrument handle may be divided into four separate units, to wit, the handle unit serving to be grasped by the hand of the operator; the switch unit, arranged to control the circuit; the instrument or needle-holding unit, to which instruments of varying forms may be separably attached; and the separable instrument or needle unit.

The handle unit comprises the tubular structure 1 which may have its outer surface fluted or formed into a plurality of flat surfaces, and is provided with the internally disposed threads 2 at its forward end and the internally disposed screw threads 3 at its rear end with which the hollow abutment plug 4 serving as a collar may be engaged.

The switch unit comprises the core 5, which may be formed of bakelite or other suitable electrical resistance material and which is generally cylindrical in form, being provided with oppositely disposed grooves 6 and 7 extended longitudinally thereof, and having at its forward end the bore 9. Said core 5 is incased by the cylindrical sleeve 10 having the lining 11 of insulating material into which said core 5 may be forced and retained.

The sleeve 10 is in threaded engagement at its rear end 12 with the switch block 13 having the enlarged band 15 forming the shoulder 16 against which said sleeve 10 engages and the shoulder 17 affording an abutment arranged to engage the forward end of the abutment plug 4. Said switch plug 13 is provided with the ferrule 19 having the abutment shoulder 18 arranged to engage the abutment plug 4 to limit the forward movement of the switch unit in the handle unit and provided with the flared terminal flange 20 forming an open mouth 21 merging into the bore 22 of said switch block 13, through which the leads 23 and 25 having the terminal connectors 26 and 27 respectively lead into the bore of the sleeve 10 and its insulated lining 11. The lead 23 is suitably attached at 29 to the spring contact 30, the spring tang 31 of which is provided with the contact point 32 extended inwardly toward the axis of the implement. The lead 25 is suitably attached at 33 to the spring contact 35, the spring tank 36 of which is provided with the contact point 37 extended inwardly toward the axis of the implement in a direction opposite to the direction of the point 32, said points being disposed at relatively different axial positions in said sleeve.

The spring contact 30 is inwardly bent at 39 to engage in the pocket 40 of the slot 6 to maintain its axial position therein, and similarly the spring contact 35 is bent inwardly at 42 into the pocket 43 in the slot 7 to maintain its axial position therein, it being noted that when said sleeve is removed from its threaded engagement with the switch-block 13, both of the spring contacts 30 and 35 are free to drop out of their respective slots 6 and 7 so that they may be readily removed and replaced.

It will be obvious that the entire mechanism of the handle may be separated by removing the abutment plug 4, which permits the switch mechanism including the switch plug 13 and parts attached thereto to be slipped from the tubular structure 1, and by removing the sleeve 10 from the switch-block 13 the core will be exposed to permit the removal of the spring contacts 30 and 35 and by breaking the joints where said spring contacts are connected at 29 and 33 to the leads 23 and 25, said leads may be conveniently drawn out for inspection, repair and replacement.

The screw threads 2 at the forward end of the tubular casing 1 afford means for attaching the instrument holder which comprises the body 45 having the nut 46 and the threaded rearward extension 47, which, as shown in Fig. 2, is conveniently engaged with the threads 2 of said tubular casing 1 of the handle, and also has the forwardly directed tubular extension 49 provided at its outer end with the hollow tapering shell or cap 50 preferably formed of copper and engaged with the forward end of the extension 49 by any suitable manner as by brazing, said cap 50 being preferably filled with a refractory cement 51 in which is embedded the heating coil 52, the terminals 53 and 54 of which are connected with the wires 55 and 56 extended rearwardly through the insulation filling 57 disposed in the forward extension 49 of the body 45, and said wires 55 and 56 terminate within the body 45 and are respectively connected to the contact sleeve 59, which is held in the insulated lining 60 in the body 45 and to the axial rearwardly extending stem contact 61 extending suitably beyond the end of the sleeve 59 and being provided for the greater part of its length with an insulated covering 62 disposed between said stem contact 61 and the sleeve contact 59 thereby insulating one from the other and extending rearwardly considerably beyond the inner end of said sleeve contact 59.

Referring to Fig. 2 of the drawing it will be noted that when the body 45 of the instrument holder has its threads 47 engaged with the threads 2 of the tubular casing 1, the stem contact will be engaged by the contact point 32 of the spring contact 30, and the sleeve contact 59 will be engaged by the contact point 37 of the spring contact 35 to form an electric circuit necessary to energize the heating element 50, said circuit being closed through the lead 23, spring contact 30, tang 31, contact point 32, stem contact 61, wire 56, heating element 50, wire 55, sleeve contact 59, contact point 37, tang 36, spring contact 35, and lead 25.

However, if it is desired to break the electric circuit thus described, the switch-block and the switch mechanism connected therewith may be longitudinally shifted forwardly with respect to the tubular casing 1 until the abutment 18 engages the rear end of the abutment plug 4, in which position the contact point 32 will have been slid from contact with the surface of the stem contact 61 on to the insulated covering 62, so that no current can pass through the handle to energize the heating element 52. Thus it will be seen, the circuit may be broken by slightly shifting the switch mechanism including the ferrule 19 with respect to the tubular casing 1 forming the handle, and these parts, however, may be maintained in their operative position to afford a closed circuit by means of the spring tang 65, serving as a detent which has the laterally extending projection 66 arranged to enter the circular groove 67 in the bore of the abutment plug 4, as shown in Fig. 3.

As shown in Fig. 3, the instrument holder is provided with the external screw threads 70 remote from its forward end arranged to receive the internal screw threads 71 of the elongated thimble 72, which is telescopically disposed about the forward tubular extension 49 of the instrument holder. said thimble for the greater part of its length being disposed free from said extension 49 and affording an annular air space. The forward end, however, of said thimble is provided with a tapering pocket 73 which is arranged to snugly engage the cap 50 of the heating element 52, so as to convey heat from said heating element 52 to the instrument 75, which, in the instance shown, is a tapered pointed needle removably engaged with the outwardly projecting threaded stem 76 of the thimble 72.

It will, of course, be understood that this instrument which, as shown in Fig. 3, is detachable and replaceable, and may be of different forms or may be formed unitary with the thimble if desired, as shown in the modification in Fig. 5, wherein the ferrule 82 has its pointed instrument 85 formed unitary therewith and directed forwardly at an angle with respect to the axis of said ferrule and the heating implement to which it is to be attached.

The heating implement herein described is applicable to a variety of uses, and in addition to the pointed instruments herein shown and described, it may be employed in connection with other forms of heating points and cauteries, and such handle may be connected with a similar holder for carrying a mouth lamp for illumination purposes; therefore, I do not desire to limit my invention to the precise details of construction and arrangement as herein set forth, as it is obvious that various modifications may be made therein without departing from the essential features of my invention as defined in the appended claims.

Having thus described my invention, I claim:

1. An implement of the class described, comprising a tubular casing affording a handle, an instrument holder provided with a heating element disposed with its forward end detachably engaged with said handle and having electrical contacts extended into said handle, switch mechanism longitudinally movable in said handle and provided with electric leads arranged to connect electric line conductors with said electric contacts and by its longitudinal movement make or break the electric circuit in said heating element, and an elongated thimble removably engaged with said instrument holder at a region remote from said heating element, but having contact therewith adjacent to said heating element affording an intermediate region out of contact and providing an air space.

2. An implement of the class described, comprising a handle body, an instrument holder detachably engaged with and withdrawn from the outer end of the handle body and having electrical contacts within the said handle body, a switch body at the other end of the handle body extending within the said handle body carrying electrical supply lines and having spring contacts for engaging electrical contacts of said instrument holder arranged to complete an electrical circuit by a relative longitudinal movement of said handle body and said switch in a direction to increase the length of the handle.

3. An implement of the class described, comprising a tubular casing forming a handle having abutment and retaining means, a switch unit movable longitudinally in said handle and comprising a tubular casing having an insulated lining, a core of insulating material within said lining having opposed longitudinal grooves forming abutments, spring contact members removably engaged in said grooves and bent to engage said abutments to prevent their relative longitudinal movement therein, line leads extended into said casing and removably engaged with said spring contact members, a spring retainer on said switch unit arranged to engage the retaining means on said handle, and an instrument-holding unit having a heating element connected by leads with relatively insulated contacts arranged to be engaged by said spring contact members, one of said contacts having an insulated sleeve arranged to be engaged by one of said contact members when said switch unit is moved forwardly in said handle.

4. An implement of the class described, comprising a handle body, an instrument holder detachably engaged with one end of the handle body and having electrical contacts axially movable within the said handle body, a switch body projecting from the other end of said handle body and extending within the handle body carrying electrical supply lines, said switch body being telescopically movable within said handle body, and means comprising a detent arranged to arrest said switch body in its operative withdrawn position.

ROBERT C. ANGELL.

CERTIFICATE OF CORRECTION.

Patent No. 1,968,867.                                                               August 7, 1934.

ROBERT C. ANGELL.

It is hereby certified that error appears in the printed specification of the above numbered patent requiring correction as follows: Page 3, line 80, claim 2, after "switch" insert body; and line 81, same claim, for "handle" read implement; and that the said Letters Patent should be read with these corrections therein that the same may conform to the record of the case in the Patent Office.

Signed and sealed this 11th day of September, A. D. 1934.

(Seal)                                           Leslie Frazer
                                               Acting Commissioner of Patents.